United States Patent
Oba

(10) Patent No.: US 10,855,219 B2
(45) Date of Patent: Dec. 1, 2020

(54) DRIVE DEVICE

(71) Applicant: TOYOTA JIDOSHA KABUSHIKI KAISHA, Toyota (JP)

(72) Inventor: Tomoko Oba, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/232,593

(22) Filed: Dec. 26, 2018

(65) Prior Publication Data

US 2019/0199270 A1   Jun. 27, 2019

(30) Foreign Application Priority Data

Dec. 27, 2017 (JP) .................................. 2017-250523

(51) Int. Cl.
*H02P 29/68* (2016.01)
*H02P 27/06* (2006.01)

(52) U.S. Cl.
CPC .............. *H02P 29/68* (2016.02); *H02P 27/06* (2013.01)

(58) Field of Classification Search
CPC .... H02P 6/182; Y02T 10/7077; B60W 10/08; B60L 15/025; B60L 2240/421
See application file for complete search history.

(56) References Cited

U.S. PATENT DOCUMENTS

| | | | |
|---|---|---|---|
| 2012/0081054 A1* | 4/2012 | Hisada | H02P 25/24 318/400.41 |
| 2012/0139460 A1* | 6/2012 | Senkou | H02P 29/032 318/400.02 |
| 2013/0076126 A1* | 3/2013 | Hashimoto | B60L 1/003 307/9.1 |
| 2013/0343105 A1 | 12/2013 | Kosugi | |
| 2016/0311324 A1* | 10/2016 | Kaji | B60L 3/003 |
| 2018/0154931 A1* | 6/2018 | Shinkawa | B62D 5/046 |
| 2019/0092382 A1* | 3/2019 | Kogure | B62D 5/0481 |
| 2019/0199270 A1* | 6/2019 | Oba | H02P 27/06 |

FOREIGN PATENT DOCUMENTS

| | | |
|---|---|---|
| JP | 2009-148080 A | 7/2009 |
| JP | 2016-208687 A | 12/2016 |
| WO | 2012/124073 A1 | 9/2012 |

\* cited by examiner

*Primary Examiner* — Zoheb S Imtiaz
(74) *Attorney, Agent, or Firm* — Sughrue Mion, PLLC

(57) ABSTRACT

There is provided a drive device configured to impose a more appropriate limitation on driving of a motor. The drive device comprises a motor configured to generate an induced voltage according to a rotation speed, and an inverter configured to drive the motor. Upon satisfaction of a predetermined condition to impose a limitation on driving of the motor, the drive device performs a drive limitation that imposes a larger limitation on driving of the motor when the induced voltage of the motor is higher than an input voltage that is input from a power storage device side to the inverter, compared with a limitation imposed when the induced voltage of the motor is equal to or lower than the input voltage.

2 Claims, 3 Drawing Sheets

DRIVE DEVICE

CROSS-REFERENCE TO RELATED APPLICATIONS

The present disclosure claims priority to Japanese Patent Application No. 2017-250523 filed Dec. 27, 2017, which is incorporated herein by reference in its entirety including specification, drawings and claims.

TECHNICAL FIELD

The present disclosure relates to a drive device and more specifically relates to a drive device including a motor configured to generate an induced voltage according to a rotation speed and an inverter configured to drive the motor.

BACKGROUND

A proposed configuration of a drive device imposes a limitation on a load factor of a motor when the temperature of an element of an inverter used to drive the motor reaches or exceeds a reference value (as described in, for example, WO 2012/124073A). This drive device imposes a limitation on the load factor of the motor, so as to suppress overheat of the inverter element, while assuring driving of the motor to some extent.

SUMMARY

The drive device described above, however, uniformly imposes a limitation on the load factor without taking account of the rotation speed of the motor. The limitation imposed on the load factor is thus likely to be insufficient or to be excessive, depending on the rotation speed of the motor. In the motor configured to generate an induced voltage according to the rotation speed, when the induced voltage is higher than an input voltage of the inverter, field weakening control is performed to make the flow of d-axis current. It is thus likely to cause overheat of the inverter element. When the induced voltage is lower than the input voltage of the inverter, on the other hand, there is no need for field weakening control. It is thus unlikely to cause overheat of the inverter element. Imposing a uniform limitation on the load factor may cause overheat of the inverter element in the case of insufficient limitation on the load factor and may cause a shortage of driving force in the case of excessive limitation on the load factor.

A main object of a drive device of the present disclosure is to impose a more appropriate limitation on driving of a motor.

In order to achieve the above primary object, the drive device of the present disclosure employs the following configuration.

The present disclosure is directed to a drive device. The drive device includes a motor configured to generate an induced voltage according to a rotation speed, an inverter configured to drive the motor, a power storage device configured to supply electric power to the motor via the inverter and a control device configured to control the inverter. Upon satisfaction of a predetermined condition to impose a limitation on driving of the motor, the control device performs a drive limitation that imposes a larger limitation on driving of the motor when the induced voltage of the motor is higher than an input voltage that is input from the power storage device side to the inverter, compared with a limitation imposed when the induced voltage of the motor is equal to or lower than the input voltage.

Upon satisfaction of the predetermined condition to impose a limitation on driving of the motor, the drive device of this aspect imposes the larger limitation on driving of the motor when the induced voltage of the motor is higher than the input voltage that is input from the power storage device side to the inverter, compared with the limitation imposed when the induced voltage of the motor is equal to or lower than the input voltage. Accordingly, the drive device of this aspect imposes the larger limitation on driving of the motor when the induced voltage of the motor is higher than the input voltage, while imposing the smaller limitation on driving of the motor when the induced voltage of the motor is equal to or lower than the input voltage. As described above, when the induced voltage of the motor is higher than the input voltage, field weakening control is performed to make the flow of d-axis current. It is thus likely to cause overheat of an inverter element. Accordingly, the larger limitation is imposed on driving of the motor. This suppresses overheat of the inverter element. When the induced voltage of the motor is equal to or lower than the input voltage, on the other hand, field weakening control is not performed. It is thus unlikely to cause overheat of the inverter element. Accordingly, the smaller limitation is imposed on driving of the motor. This suppresses a shortage of driving force. As a result, this configuration imposes a more appropriate limitation on driving of the motor.

DESCRIPTION OF EMBODIMENTS

The following describes some aspects of the disclosure with reference to embodiments.

Figure 1:
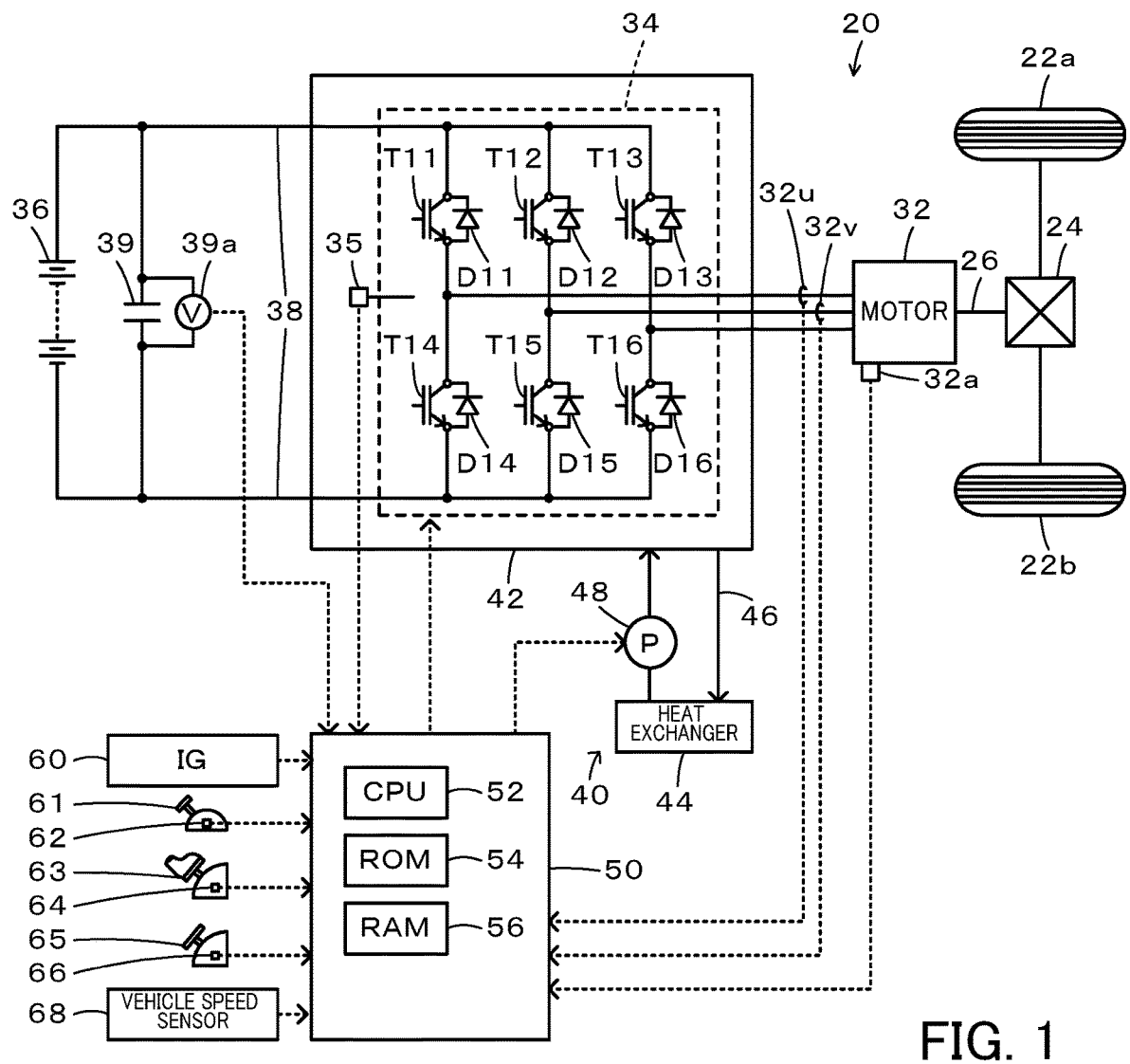
FIG. 1 is a configuration diagram illustrating the schematic configuration of an electric vehicle equipped with a drive device according to one embodiment of the present disclosure.

FIG. 1 is a configuration diagram illustrating the schematic configuration of an electric vehicle 20 equipped with a drive device according to one embodiment of the present disclosure. As illustrated, the electric vehicle 20 of the embodiment includes a motor 32, an inverter 34, a cooling device 40, a battery 36 serving as a power storage device, and an electronic control unit 50. The "drive device" according to the embodiment corresponds to the motor 32, the inverter 34, the cooling device 40, the battery 36 and the electronic control unit 50.

The motor 32 is configured as a synchronous motor generator having a rotor with permanent magnets embedded therein and a stator with three-phase coils wound thereon. The rotor of this motor 32 is connected with a driveshaft 26 that is coupled with drive wheels 22a and 22b via a differential gear 24.

The inverter 34 is used to drive the motor 32 and is connected with the battery 36 via power lines 38. This inverter 34 includes transistors T11 to T16 serving as six switching elements, and six diodes D11 to D16 that are respectively connected in parallel to the six transistors T11 to T16. The transistors T11 to T16 are arranged in pairs, such that two transistors in each pair respectively serve as a source and as a sink relative to a positive electrode line and a negative electrode line of the power lines 38. The respective phases of the three-phase coils (U phase, V phase and W phase coils) of the motor 32 are connected with connection points of the respective pairs of the transistors T11 to T16. Accordingly, when a voltage is applied to the inverter 34, the electronic control unit 50 regulates the rates of ON times of the respective pairs of the transistors T11 to T16 to provide a rotating magnetic field in the three-phase coils and thereby rotate and drive the motor 32.

The cooling device 40 includes a heat receiving portion 42 mounted to the inverter 34, a heat exchanger 44 configured to exchange heat with the outside air, a circulation flow path 46, and a pump 48 mounted to the circulation flow path 46 to circulate a cooling medium. The circulation flow path 46 is a flow path arranged to connect a flow path of the cooling medium in the heat receiving portion 42 with a flow path of the cooling medium in the heat exchanger 44 and thereby circulate the cooling medium. The cooling medium used may be, for example, LLC (long life coolant).

The battery 36 is configured by, for example, a lithium ion rechargeable battery or a nickel metal hydride battery and is connected with the inverter 34 via the power lines 38 as described above. A capacitor 39 is mounted to the positive electrode line and the negative electrode line of the power lines 38.

The electronic control unit 50 is configured as a CPU 52-based microprocessor and includes a ROM 54 configured to store processing programs, a RAM 56 configured to temporarily store data, and input/output ports, in addition to the CPU 52. Signals from various sensors are input into the electronic control unit 50 via the input port. The signals input into the electronic control unit 50 include, for example, a rotational position θm from a rotational position detection sensor (for example, a resolver) 32a configured to detect the rotational position of the rotor of the motor 32 and phase currents Iu and Iv from current sensors 32u and 32v configured to detect the phase currents of the respective phases of the motor 32. The input signals also include a voltage Vb of the battery 36 from a voltage sensor (not shown) placed between terminals of the battery 36, an electric current Ib of the battery 36 from a current sensor (not shown) mounted to an output terminal of the battery 36, and a voltage VH of the capacitor 39 (power lines 38) (inverter input voltage VH) from a voltage sensor 39a placed between terminals of the capacitor 39. The input signals additionally include an inverter temperature Tinv from a temperature sensor 35 mounted to the inverter 34. The input signals furthermore include an ignition signal from an ignition switch 60 and a shift position SP from a shift position sensor 62 configured to detect an operating position of a shift lever 61. The input signals further include an accelerator position Acc from an accelerator pedal position sensor 64 configured to detect a depression amount of an accelerator pedal 63, a brake pedal position BP from a brake pedal position sensor 66 configured to detect a depression amount of a brake pedal 65, and a vehicle speed V from a vehicle speed sensor 68. The electronic control unit 50 outputs, for example, switching control signals to the transistors T11 to T16 of the inverter 34 and a driving signal to the pump 48 of the cooling device 40 via the output port. The electronic control unit 50 calculates an electrician angle θe and a rotation speed Nm of the motor 32, based on the rotational position θm of the rotor of the motor 32 from the rotational position detection sensor 32a.

In the electric vehicle 20 of the embodiment having the configuration described above, the electronic control unit 50 performs a control routine (not shown) to set a required torque Td* that is required for the driveshaft 26, based on the accelerator position Acc and the vehicle speed V and to set the set required torque Td* to a torque command Tm* of the motor 32. When there is a drive limitation (torque limitation) on driving of the motor 32, the electronic control unit 50 limits the torque command Tm* of the motor 32 and performs switching control of the transistors T11 to T16 of the inverter 34, such as to drive the motor 32 with the torque command Tm*.

Figure 2:
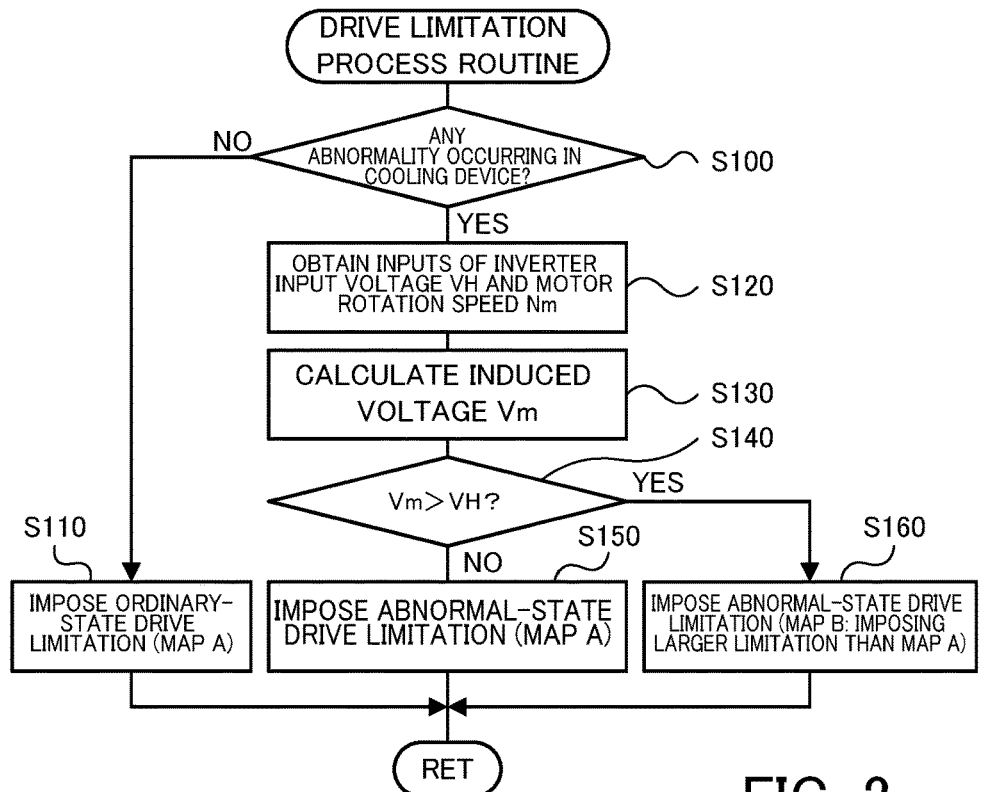
FIG. 2 is a flowchart showing one example of a drive limitation process routine performed by the electronic control unit.

The following describes operations of the drive device mounted on the electric vehicle 20 of the embodiment or more specifically a series of operations to impose a drive limitation on driving of the motor 32. FIG. 2 is a flowchart showing one example of a drive limitation process routine performed by the electronic control unit 50. This routine is repeatedly performed at predetermined time intervals.

Figure 3:
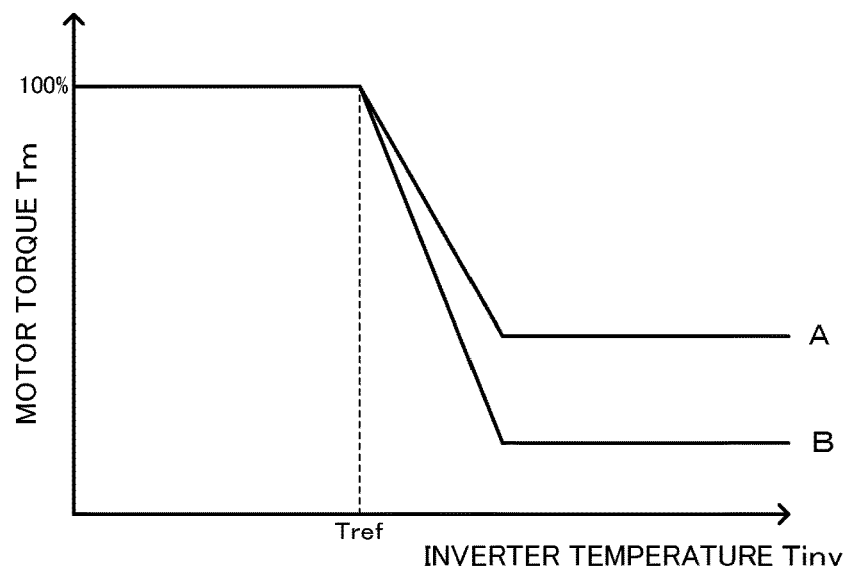
FIG. 3 is a diagram illustrating one example of drive limitation maps A and B.

When the drive limitation process routine is triggered, the electronic control unit 50 first determines whether there is any abnormality occurring in the cooling device 40 (step S100). The abnormality of the cooling device 40 may be, for example, a failure of the pump 48 or leakage of the cooling medium (LLC). The occurrence of such an abnormality is diagnosed by an abnormality diagnosis (not shown) and is written in an abnormality diagnosis flag. A procedure of the embodiment checks the value of this abnormality diagnosis flag to determine whether there is any abnormality occurring in the cooling device 40. When it is determined that there is no abnormality occurring in the cooling device 40, the electronic control unit 50 imposes an ordinary-state drive limitation using a map A (step S110) and then terminates this routine. FIG. 3 illustrates one example of maps A and B. As illustrated, the map A used for the ordinary-state drive limitation is set such as to impose the larger limitation at the higher inverter temperature Tinv in a range that the inverter temperature Tinv is equal to or higher than a reference value Tref.

When it is determined at step S100 that there is an abnormality occurring in the cooling device 40, on the other hand, the electronic control unit 50 obtains the inputs of the voltage VH from the voltage sensor 39a as the inverter input voltage and the rotation speed Nm of the motor 32 (step S120). The rotation speed Nm of the motor 32 input here is a value calculated based on the rotational position θm of the rotor of the motor 32 from the rotational position detection sensor 32a. The electronic control unit 50 subsequently calculates an induced voltage Vm of the motor 32, based on the input rotation speed Nm of the motor 32 (step S130). The induced voltage Vm may be determined by multiplying the rotation speed Nm by a conversion factor that is used for calculation of the induced voltage.

The electronic control unit 50 subsequently determines whether the calculated induced voltage Vm is higher than the inverter input voltage VH (step S140). When it is determined that the induced voltage Vm is equal to or lower than the inverter input voltage VH, the electronic control unit 50 imposes an abnormal-state drive limitation in the abnormal state of the cooling device 40 using the map A like the ordinary state (step S150) and then terminates this routine. When it is determined that the induced voltage Vm is higher than the inverter input voltage VH, on the other hand, the electronic control unit 50 imposes an abnormal-state drive limitation in the abnormal state of the cooling device 40 using a map B that imposes a larger limitation than the map A (step S160) and then terminates this routine. As shown in FIG. 3, the map B imposes the larger limitation on the motor torque Tm compared with the map A, in the range that the inverter temperature Tinv is equal to or higher than the reference value Tref. When the induced voltage Vm of the motor 32 is higher than the inverter input voltage VH, field weakening control is performed. This causes a d-axis current to flow in the motor 32, and it is likely to cause overheat of the inverter element. Accordingly, the larger limitation is imposed on driving of the motor 32. This suppresses overheat of the inverter element. When the induced voltage Vm of the motor 32 is equal to or lower than the inverter input voltage VH, on the other hand, field weakening control is not performed. It is thus unlikely to cause overheat of the inverter element. Accordingly, the smaller limitation is imposed on driving of the motor 32. This suppresses an excessive shortage of driving force.

As described above, in the event of an abnormality occurring in the cooling device 40 that is used to cool down the inverter 34, when the induced voltage Vm of the motor 32 is higher than the inverter input voltage VH, the drive device mounted on the electric vehicle 20 of the embodiment imposes a larger limitation on driving of the motor 32, compared with the limitation imposed when the induced voltage Vm is equal to or lower than the inverter input voltage VH. This configuration suppresses overheat of the inverter element and suppresses an excessive shortage of driving force. As a result, this imposes a more appropriate limitation on driving of the motor 32.

Figure 4:
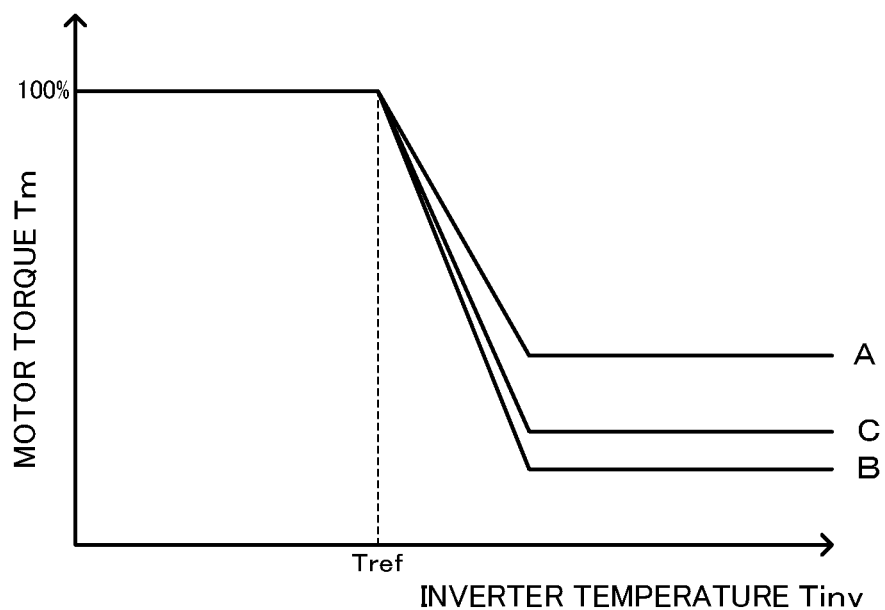
FIG. 4 is a diagram illustrating one example of drive limitation maps A, B and C according to a modification.

In the event of no abnormality occurring in the cooling device 40 that is used to cool down the inverter 34, the drive device mounted on the electric vehicle 20 of the embodiment imposes the drive limitation using the map A. According to a modification, however, even in the event of no abnormality occurring in the cooling device 40 that is used to cool down the inverter 34, when the induced voltage Vm of the motor 32 is higher than the inverter input voltage VH, a larger limitation may be imposed on driving of the motor 32 in the range that the inverter temperature Tinv is equal to or higher than the reference value Tref, compared with the limitation imposed when the induced voltage Vm is equal to or lower than the inverter input voltage VH. For example, as shown in FIG. 4, this modification may impose a drive limitation using the map A when the induced voltage Vm is equal to or lower than the inverter input voltage VH and may impose a drive limitation using a map C, which imposes a smaller limitation compared with the map B used for the abnormal-state drive limitation in the abnormal state of the cooling device 40, when the induced voltage Vm is higher than the inverter input voltage VH. This modification imposes a larger limitation on driving of the motor 32 when an abnormality occurs in the cooling device 40, compared with the limitation imposed when no abnormality occurs in the cooling device 40 but the inverter temperature Tinv is equal to or higher than the reference value Tref. This is based on the following. When no abnormality occurs in the cooling device 40, cooling by the cooling device 40 suppresses a temperature rise of the inverter element. When an abnormality occurs in the cooling device 40, however, cooling by the cooling device 40 is unexpected. This accordingly fails to suppress a temperature rise of the inverter element.

Figure 5:
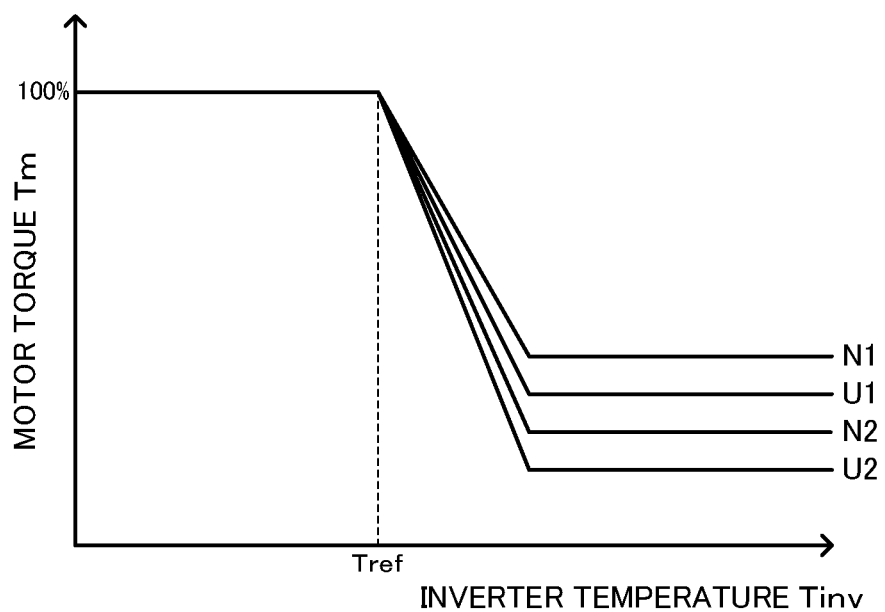
FIG. 5 is a diagram illustrating one example of drive limitation maps N1, N2, U1 and U2 according to another modification.

In the event of an abnormality occurring in the cooling device 40 that is used to cool down the inverter 34, when it is determined that the induced voltage Vm of the motor 32 is equal to or lower than the inverter input voltage VH, the drive device mounted on the electric vehicle 20 of the embodiment imposes the drive limitation using the map A like the ordinary state. According to a modification, however, a larger limitation may be imposed on driving of the motor 32, compared with the limitation imposed in the ordinary state. For example, as shown in FIG. 5, in the event of no abnormality occurring in the cooling device 40, this modification may impose a drive limitation using a map N1 when the induced voltage Vm is equal to or lower than the inverter input voltage VH and may impose a drive limitation using a map N2, which imposes a larger limitation than the map N1, when the induced voltage Vm is higher than the inverter input voltage VH. In the event of an abnormality occurring in the cooling device 40, this modification may impose a drive limitation using a map U1, which imposes a larger limitation than the map N1, when the induced voltage Vm is equal to or lower than the inverter input voltage VH and may impose a drive limitation using a map U2, which imposes a larger limitation than the map N2, when the induced voltage Vm is higher than the inverter input voltage VH.

The drive device mounted on the electric vehicle 20 of the embodiment uses the battery 36 as the power storage device. The power storage device used may, however, be any device that is capable of accumulating electricity, for example, a capacitor.

The embodiment describes the aspect of the drive device that is mounted on the electric vehicle 20 equipped with the motor 32. The present disclosure may also be implemented as an aspect of the drive device that is mounted on a hybrid vehicle equipped with an engine in addition to the motor 32, as an aspect of the drive device that is mounted on a moving body, such as a vehicle other than automobile, a ship or boat or an aircraft, or as an aspect of the drive device that is mounted on stationary equipment such as construction equipment.

In the drive device of this aspect, the predetermined condition may include one of a condition that an abnormality occurs in a cooling device configured to cool down the inverter and a condition that a temperature of the inverter is equal to or higher than a predetermined temperature. In this case, the control device may impose a larger limitation on driving of the motor when an abnormality occurs in the cooling device, compared with a limitation imposed when the temperature of the inverter is equal to or higher than the predetermined temperature. This configuration imposes a larger limitation on driving of the motor when an abnormality occurs in the cooing device, compared with the limitation imposed when no abnormality occurs in the cooling device but the temperature of the inverter is equal to or higher than the predetermined temperature. This is based on the following. When no abnormality occurs in the cooling device, cooling by the cooling device suppresses a temperature rise of the inverter element. When an abnormality occurs in the cooling device, however, cooling by the cooling device is unexpected. This accordingly fails to suppress a temperature rise of the inverter element.

The following describes the correspondence relationship between the primary components of the embodiment and the primary components of the disclosure described in Summary. The motor 32 of the embodiment corresponds to the "motor", the inverter 32 corresponds to the "inverter", the battery 36 corresponds to the "power storage device", and the electronic control unit 50 corresponds to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the drive device and so on.

The invention claimed is:

1. A drive device, comprising:
   a motor configured to generate an induced voltage according to a rotation speed;
   an inverter configured to drive the motor;
   a power storage device configured to supply electric power to the motor via the inverter; and
   a control device configured to control the inverter,
   wherein upon satisfaction of a predetermined condition to impose a limitation on driving of the motor, the control device
   imposes a first driving limitation on driving of the motor when the induced voltage of the motor is higher than an input voltage that is input from the power storage device side to the inverter, and
   imposes a second driving limitation that is larger than the first driving limitation on driving of the motor when the induced voltage of the motor is equal to or lower than the input voltage,
   wherein the second driving limitation is equal to the first driving limitation in a first range in which a temperature of the inverter is lower than a predetermined temperature, and is larger than the first driving limitation in a second range in which the temperature of the inverter is higher than or equal to the predetermined temperature,
   wherein the drive device stores a first map indicating the first driving limitation, and a second map indicating the second driving limitation,
   wherein the control device applies the first map when the induced voltage is higher than the input voltage, and applies the second map when the induced voltage of the motor is equal to or lower than the input voltage, and
   wherein a first rate of motor torque decrease per inverter temperature increase in the first map is less than a second rate of motor torque decrease per inverter temperature increase in the second map.

2. The drive device according to claim 1, wherein the predetermined condition includes one of a condition that is satisfied when an abnormality occurs in a cooling device configured to cool down the inverter.

* * * * *